Patented Nov. 9, 1948

2,453,147

UNITED STATES PATENT OFFICE 2,453,147

ESTERS OF PERFLUOROADIPIC ACID

Earl T. McBee, La Fayette, and Park A. Wiseman, Muncie, Ind., assignors to Purdue Research Foundation, La Fayette, Ind., a corporation of Indiana No Drawing. Application July 30, 1946, Serial No. 687,226

4 Claims. (Cl. 260—485)

The present invention relates to esters of perfluoroadipic acid.

Perfluoroadipic acid has the formula

HOOC—(CF$_2$)$_4$—COOH and may be prepared as disclosed in our prior-filed application Serial Number 625,108, filed October 27, 1945, of which the present application is a continuation-in-part. In our prior-filed copending application is described the preparation of perfluoroadipic acid from 1,2-dichlorooctafluorocyclohexene by reaction with an oxidising agent, for example, potassium permanganate, to oxidise the chloro-substituted olefinic carbon atoms of the perhalocyclohexene. The resulting product is then concentrated, acidified, and extracted with an organic solvent, which is thereafter removed according to conventional methods. Excellent yields of the perfluoroadipic acid, which usually exists as the dihydrate, are obtained in this manner.

It is an object of the present invention to provide new and useful esters of perfluoroadipic acid. These esters are new and useful compounds having utility as chemical intermediates.

The esters of perfluoroadipic acid are usually high-boiling oily liquids, insoluble in water and having a characteristic ester-like odor. The compounds may be prepared by the reaction of the dihydrate of perfluoroadipic acid with a selected alcohol. The reaction may be carried out in the presence of a small quantity of catalyst, such as concentrated hydrochloric acid. After refluxing the reactants for a suitable period of time, e. g., 10 to 20 hours, the excess alcohol may be removed by distillation and the higher-boiling product distilled and rectified to give the desired ester in yields up to 85 per cent of the theoretical.

The esters of perfluoroadipic acid with which the present invention is concerned have the general formula

ROCO—(CF$_2$)$_4$—COOR wherein R is a lower-alkyl or lower-alkenyl radical. This radical may contain from one to eight carbon atoms, inclusive, and may be selected from such radicals comprising either straight or branched chain structures, said radicals also being characterized by presence or absence of a double bond. Representative radicals represented by R include methyl, ethyl, propyl, isopropyl, allyl, butyl, butenyl, isobutyl, amyl, pentenyl, hexyl, hexenyl, heptyl, n-octyl, and so forth. The ester of perfluoroadipic acid containing the desired R radical may be prepared by reacting the selected alcohol of the formula R—OH, with perfluoroadipic acid or the dihydrate thereof, in the manner heretofore stated and further elucidated in the following examples. Mixed esters of perfluoroadipic acid may be prepared by reacting the acid with a mixture of selected alcohols, such as methanol and ethanol, isopropyl and butyl alcohol, or the like. Esters which may be prepared in this manner are the methyl-ethyl, ethyl-butyl, methyl-isopropyl, ethyl- n-octyl, and so forth. The present invention is not concerned with the method of preparation or apparatus employed, but is concerned solely with the new group of compounds herein described and claimed.

The following examples indicate several ways in which members of this new group of compounds may be prepared, but are in no way to be construed as limiting.

Example 1.—Diethyl perfluoroadipate

One hundred grams of the dihydrate of perfluoroadipic acid, prepared according to the parent application Serial 625,108, filed October 27, 1945, 500 milliliters of ethanol, and 1 milliliter of concentrated hydrochloric acid catalyst were introduced into a two-liter, three-neck flask equipped with reflux condenser. The resulting solution was refluxed for 16 hours. At the end of this time the excess ethanol was removed by distillation, whereafter a second 500-milliliter volume of ethanol was added and slowly distilled from the flask. The high-boiling liquid residue was distilled at atmospheric pressure, and 90 grams of a light yellow liquid boiling between 215 and 219 degrees centigrade was collected. This represented an 85 per cent yield of the ester.

The product was dried over calcium chloride and rectified in a three-foot, helix-packed column under reduced pressure. The dried product charged to the column weighed 85 grams, and 76 grams of pure diethyl ester of perfluoroadipic acid, boiling between about 70 to 71 degrees centigrade at 2–3 millimeters of mercury pressure absolute, was obtained from the rectification.

Diethyl perfluoroadipate has a density at 29 degrees centigrade of 1.4025 and a refractive index at 20 degrees centigrade of 1.359.

The analysis of a sample of the diethyl ester of perfluoroadipic acid gave the following comparisons:

|  | Saponification Equivalent | Per cent Fluorine |
|---|---|---|
| Calculated for C$_2$H$_5$—OCO—(CF$_2$)$_4$—COOC$_2$H$_5$ | 173 | 44.0 |
| Found | 169 | 45.7 |

Example 2.—Diisopropyl perfluoroadipate

A mixture of the hydrated salts of sodium and potassium perfluoroadipate, as obtained from the oxidation of 0.43 moles of dichloroctafluorocyclohexene was used for this preparation. The mixed salts, weighing 257 grams, were placed in a large beaker and treated with 60 milliliters of concentrated hydrochloric acid and 50 milliliters of concentrated sulfuric acid. The resulting mixture was transferred to a distillation flask and treated with 300 milliliters of isopropyl alcohol and 100 milliliters of benzene. The resulting mixture was then distilled slowly until the distillation temperature was 105 degrees centigrade. The hot remaining liquid was then transferred to a separatory funnel and the upper organic layer separated and washed twice with water. The organic liquid was dried over anhydrous sodium sulfate and vacuum rectified. At 83–84 degrees centigrade at 3 millimeters of mercury pressure absolute, 68 grams of diisopropyl perfluoroadipate was obtained in a 42 per cent conversion and a 52.5 per cent yield. From the vacuum distillation residue, 28 grams of perfluoroadipic acid was recovered. Additional perfluoroadipic acid may be recovered from the aqueous salt mixture from which the ester was originally separated. The diisopropyl ester of perfluoroadipic acid boils at 232–233 degrees centigrade at 745 millimeters of mercury pressure absolute.

*Example 3.—Diallyl perfluoroadipate*

In a manner similar to the previous example, an excess of allyl alcohol was refluxed with perfluoroadipic acid on a steam cone for a period of twelve hours. The mixture was thereafter distilled under reduced pressure. From the reaction product was isolated diallyl perfluoroadipate, boiling between 150–160 degrees centigrade at 30 millimeters of mercury pressure absolute.

It is to be understood that the "lower-alkenyl radical" in the formulae of the appended claims includes radicals of the general formula $C_nH_{2n-1}$, these radicals containing a double bond and being customarily referred to as "alkenyl" radicals.

We claim:

1. An ester of perfluoroadipic acid, having the general formula $$ROCO—(CF_2)_4—COOR$$

wherein R is selected from lower-alkyl and lower-alkenyl radicals containing from 1 to 8 carbon atoms, inclusive.

2. The diethyl ester of perfluoroadipic acid, having the formula $$C_2H_5OCO—(CF_2)_4—COOC_2H_5$$

3. The diisopropyl ester of perfluoroadipic acid, having the formula $$(CH_3)_2CHOCO—(CF_2)_4—COOCH(CH_3)_2$$

4. The diallyl ester of perfluoroadipic acid, having the formula $$CH_2=CHCH_2—OCO—(CF_2)_3—COOCH_2CH=CH_2$$

EARL T. McBEE.
PARK A. WISEMAN.

REFERENCES CITED

The following references are of record in the file of this patent:

Farmer, "Jour. Chem. Soc." (London), vol. 123, pp. 2533 and 2539.

Henne et al., "Jour. Am. Chem. Soc." vol. 67 (1945), pp. 1235 to 1237.